E. R. CAHOONE & N. TEAS.
Harness Saddle-Tree.
No. 223,990. Patented Feb. 3, 1880.
Fig. I.
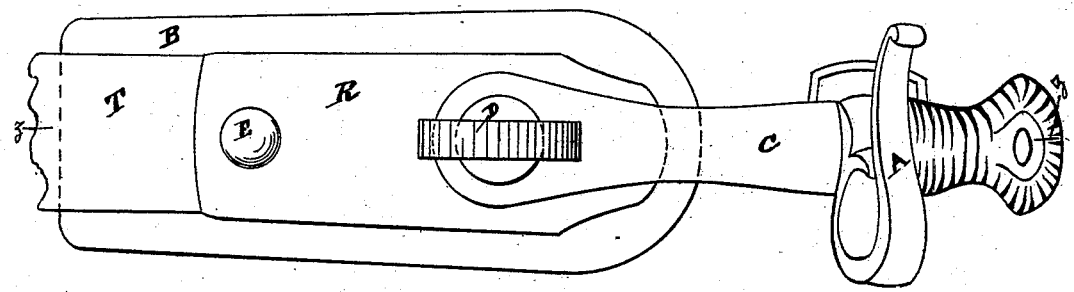
Fig. II.
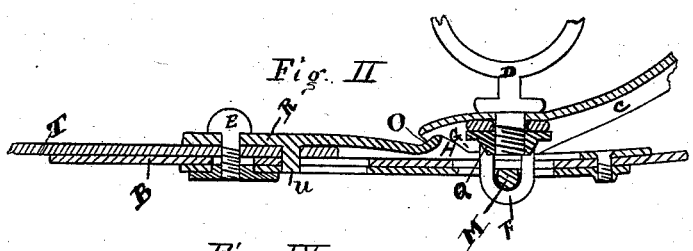
Fig. III.
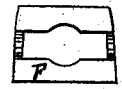
Fig. IV.
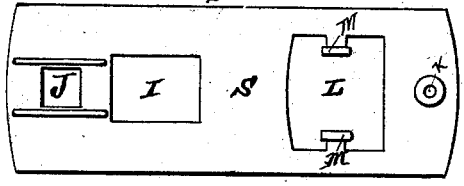
Fig. V.
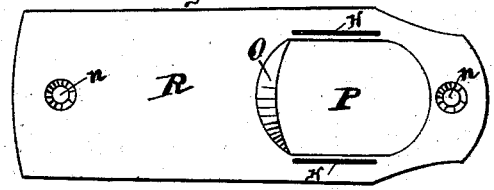
Fig. VI.
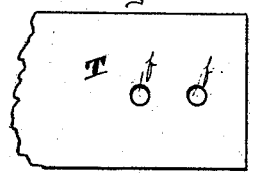
Fig. VII.
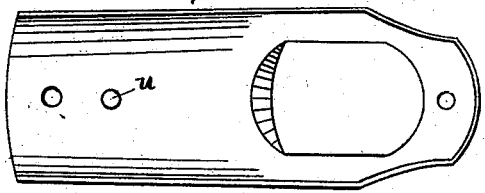
Attest:
Ernest C. Webb
Edwin A. Shorter
Inventors:
Edwin R. Cahoone
Noble Teas
By J. C. Clayton Atty

United States Patent Office.

EDWIN R. CAHOONE AND NOBLE TEAS, OF NEWARK, NEW JERSEY, ASSIGNORS TO SAID CAHOONE.

HARNESS-SADDLE TREE.

SPECIFICATION forming part of Letters Patent No. 223,990, dated February 3, 1880.

Application filed October 13, 1879.

*To all whom it may concern:*

Be it known that we, EDWIN R. CAHOONE and NOBLE TEAS, both of Newark, in the county of Essex and State of New Jersey, have invented a new and Improved Self-Adjusting Saddle-Tree, of which the following specification is a description.

The object of our invention is to produce a self-adjusting saddle-tree that will make a saddle or pad cheap, durable, firm, and handsome.

In the accompanying drawings, Figure I represents one side of a tree made up, with the parts put together, showing the iron jockeys R and the manner of using the leather side pieces, T, the terret D, yoke C, hook A, and pad-screw E.

Fig. II is a cross-section of one half, cut lengthwise on a line, z z, of Fig. I, through the center, showing the manner of uniting the parts together—i. e., side pieces, T, pad-top B, iron jockey R, yoke C, terret D, pad-screw E, rocking nut-box F, the burr or nut Q, pivot M, and ears G to fit in depressions H.

Fig. III is a top view of the rocking nut-box F.

Fig. IV is a view of the under side of the under piece, S, showing the opening I for passing down the burr for the pad-screw to the hole J, where the screw enters the burrs, the hole K for the screw to unite the upper and lower parts together, the opening L, and pivots M to receive the rocking nut-box F.

Fig. V is a view of the top or outside of the iron jockeys R, showing the depressions H to receive the ears G, the holes N, countersunk for screws, the curled upward-projecting lip O to guide and steady the yoke C. The openings P are to receive the adjustable parts containing the burrs Q.

Fig. VI is a view of the side straps, T, with holes $f f$ to receive the pad-screw E and the pin U.

Fig. VII is a view of the under side of the jockeys R, showing the pin U.

A is the check-hook. B represents the top part of the pad, which is of leather and bound all around, uniting with the same stitches the leather that incloses the stuffing. C is the yoke that unites the two pad parts together. D is the terret. E is the pad-screw. F is the rocking nut-piece. G are the ears on each side of the ends, to enter the depressions H to steady the parts and prevent side motion. H are depressions to receive the ears on the ends of the yoke-pieces. I is an opening in the under pieces to receive the burrs for changing mountings. J is a hole to receive a part of the burr or nut. K is a hole for the screw for fastening the upper and lower parts together. L is an opening in the under piece for the adjustable parts, and a means of using the pivots. M are the pivots to receive the rocking nut-box. N are screw-holes countersunk. O is one of the upward-projecting lips to receive the ends of the yoke to keep the parts steady. P is an opening in the jockey to receive the rocking nut-box. Q is one of the burrs for holding the terrets. R is the iron jockey. S is one of the under pieces. T is the leather side piece broken off, which unites the belly-band, which secures all to the horse.

Having thus described our invention, what we claim, and desire to secure by Letters Patent, is—

1. In a saddle-tree, the combination of a yoke, C, provided with downwardly-projecting ears, and jockeys R, having depressions to receive such ears, with terrets D and their burrs, to detachably connect the yoke and jockeys, substantially as specified.

2. The arch or yoke pieces, having ears on each side of their ends, which fit in depressions in the jockeys to prevent a side motion of the jockeys, substantially as specified.

3. The metal jockeys, having depressions or grooves H to receive the ears on the arch-piece, for the purpose specified, as herein set forth.

4. The rocking nut-box which unites the parts together, in combination with its burr and the terret, substantially as specified.

5. The under piece, provided with pivots M to secure the rocking nut-box in its place, substantially as specified.

6. The jockeys provided with upward-projecting curved lips O, for the purpose specified, as herein set forth.

7. The described saddle-tree, composed of the yoke C, having hook A, terrets D, rocking nut-box F, under pieces, S, jockeys R, side straps, T, and pad-screw E, substantially as herein shown and described.

EDWIN R. CAHOONE.
NOBLE TEAS.

Witnesses:
ABRAHAM MANNERS,
EDWARD G. ROBERTSON.